Feb. 24, 1925.

P. FURST 1,527,251

TRACTOR ATTACHMENT

Filed June 14, 1923     2 Sheets-Sheet 1

Peter Furst
INVENTOR

BY Victor J. Evans
ATTORNEY

WITNESS:

Feb. 24, 1925.
P. FURST
1,527,251
TRACTOR ATTACHMENT
Filed June 14, 1923
2 Sheets-Sheet 2
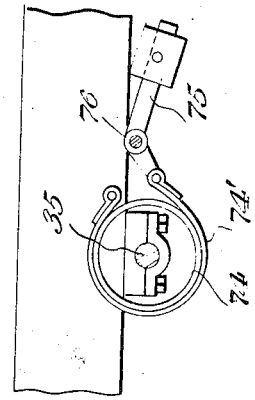
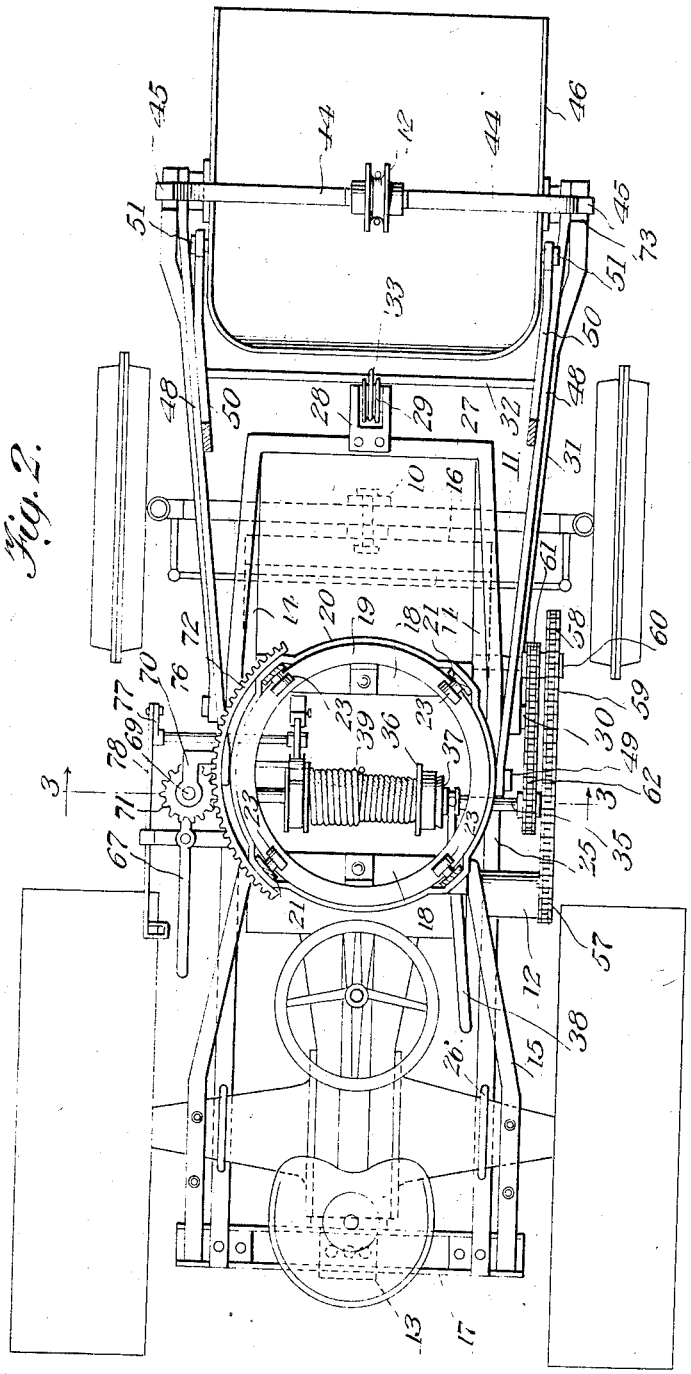
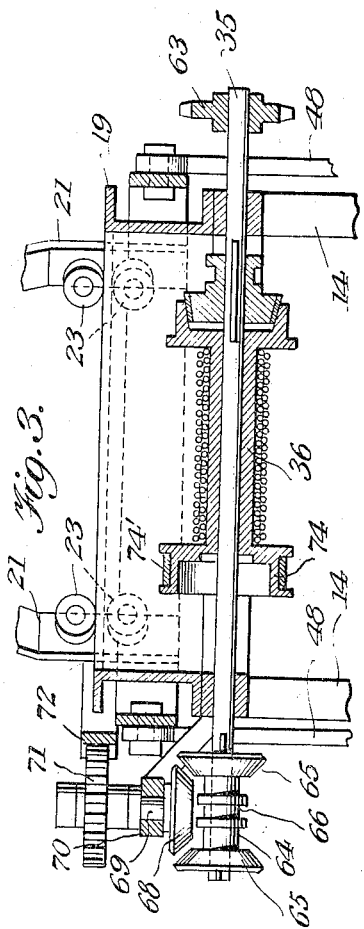
Peter Furst
INVENTOR
BY Victor J. Evans
ATTORNEY
WITNESS:

Patented Feb. 24, 1925.

1,527,251

UNITED STATES PATENT OFFICE.

PETER FURST, OF URBANA, ILLINOIS.

TRACTOR ATTACHMENT.

Application filed June 14, 1923. Serial No. 645,423.

*To all whom it may concern:*

Be it known that I, PETER FURST, a citizen of the United States, residing at Urbana, in the county of Champaign and State of Illinois, have invented new and useful Improvements in Tractor Attachments, of which the following is a specification.

This invention relates to excavating apparatus and has for an object the provision of means which may be secured to a Fordson or similar tractor, whereby the latter may be converted into a power shovel or scoop.

Another object of the invention is the provision of means of the above character which may be secured in place without changing the tractor structure, so that the device may be removed and the tractor used in the ordinary manner.

Another object of the invention is the provision of an excavating mechanism which may be operated by the power mechanism of the tractor, may be easily controlled and handled in a convenient and expeditious manner.

With the above and other objects in view, the invention further includes the following novel features and details of construction, to be hereinafter more fully described, illustrated in the accompanying drawings and pointed out in the appended claims.

In the drawings:—

Figure 1 is a side elevation showing a Fordson tractor with the invention applied thereto, the near wheels of the tractor being removed.

Figure 2 is a horizontal sectional view taken substantially on the line 2—2 of Figure 1.

Figure 3 is a fragmentary section on the line 3—3 of Figure 2.

Figure 4 is a detail view of the brake for the hoisting drum.

Referring to the drawings in detail wherein like characters of reference denote corresponding parts, the reference character 10 indicates the usual bracket or connection for securing the front axle 11 of the tractor in place, 12 indicates the shaft of the power pulley and 13 the bracket to which the draw bar (not shown) is usually connected.

The invention comprises a frame which includes side members 14 and 15, the former having their lower ends secured to a transverse angle bar 16 which is connected to the bracket 10, while the latter have their lower ends secured to a cross bar 17 which is attached to the bracket 13. The upper ends of the side bars 14 and 15 are connected by transverse channel bars 18 while mounted upon these channel bars is a transversely channel-shaped annular member 19 which is stationary.

Surrounding the member 19 is an annulus 20, while secured to and rising from this annulus are standards 21, to the upper end of which there is secured a beam 22 which provides a boom. The standards 21 have secured thereto faced rollers 23 and these rollers receive between them the upper flange of the member 19 so as to support the standards in a manner to permit of their rotation upon the member 19, while the annulus 20 serves to connect the lower ends of the standards. The bar 22 is provided at one end with a counter-balance weight 24 whose purpose will be later apparent.

The frame further includes a yoke 25 whose ends are connected to the transverse bar 17 and to the rear axle housing of the tractor by means of U-bolts 26. The arms of this yoke extend forwardly upon opposite sides of the tractor and are connected at their forward ends by the bar 27 while secured to this bar is a bracket 28 within which is mounted a grooved pulley 29.

Pivotally secured to the side arms of the yoke 25 as shown at 30 are forwardly extending arms 31 and the forward ends of these arms are connected by a bar 32 to which is attached one end of a cable 33. This cable extends forwardly and over the pulley 29 and is provided with a counterbalance weight 34 which acts to support the outer ends of the arms 31.

Extending transversely beneath the channel member 19 is a shaft 35 and rotatable upon this shaft is a hoisting drum 36 which may be locked to the shaft by means of a clutch 37 controlled by a lever 38. Wound upon the drum 36 is a cable 39 which extends forward over a grooved pulley 40 mounted at the upper end of the standards 21, the said cable extending outward along the boom and around a grooved pulley 41 mounted upon the outer end of the boom. The cable then extends downward around a grooved pulley 42 which is mounted upon a transverse bar or shaft 43, while secured to the opposite ends of this bar or shaft are arms 44. These arms extend downward and have pivotally secured to their lower ends by means of pins or studs 45, a shovel or scoop 46. The cable 39 then extends forward and has its upper end secured to the outer end of the boom as shown at 47.

The shovel or scoop 46 is connected to the annulus 20 by means of a rod 48, one end of which is pivotally mounted upon the pin or stud 45, while the opposite end is mounted upon a pivot pin 49 secured to the annulus 20. Additional rods 50 of equal length with the rods 48 have their outer ends pivotally secured to the shovel or scoop as shown at 51, while the inner ends of these rods are pivotally secured as shown at 52 to a lever 53. This lever is pivotally mounted upon a stud or pin 54 which is carried by the uprights or standards 21 and this lever carries a spring actuated latch 55 which is adapted to engage the teeth of a stationary segment 56 to hold the shovel or scoop in adjusted position.

By adjusting the lever 53, the working height of the shovel or scoop 46 may be regulated, or, the said shovel or scoop may be held in elevated position when not in use.

Mounted upon the power pulley shaft 12 is a sprocket 57 which is connected to a sprocket 58 by means of a chain 59. The sprocket 58 is mounted upon a shaft 60 to which there is also secured a relatively small sprocket 61. This last named sprocket is connected by means of a chain 62 to a sprocket 63 which is mounted upon the drum shaft 35.

The shaft 35 may thus be driven by the operation of the power mechanism of the tractor and when the latter is operated, the shaft 35 will be continuously driven. The operation of the drum 36 however may be controlled by the clutch 37 as previously mentioned. Thus the scoop or shovel 46 may be raised or lowered at will.

The sprocket 63 is mounted upon one end of the shaft 35 and upon the opposite end of this shaft there is slidingly mounted a sleeve 64 which has secured to its opposite ends beveled gears 65. The sleeve 64 is provided with a grooved collar 66 which is engaged by the forks of a lever 67 so as to move either of the gears 65 into engagement with a beveled gear 68. This last mentioned gear is mounted upon a short shaft 69 which operates in a bearing 70 and also mounted upon this shaft is a sprocket wheel 71. This last mentioned wheel engages a toothed rack 72 which is secured to the annulus 20. By this means the annulus may be rotated in either direction by shifting the proper beveled gear 65 into engagement with the beveled gear 68. When the gears 65 and 68 are all disengaged, the annulus 20 will remain stationary.

In the operation of the invention, the scoop or shovel may be moved to a lowered position and when in such position the studs or pins 45 will rest within seats 73 provided in the outer ends of the arms 31. The tractor may then be moved forward so as to fill the shovel or scoop and the latter may be elevated by operating the clutch 37 to lock the drum 36 to the shaft 33. After the shovel or scoop reaches the desired height, the clutch 37 may be disengaged and either of the gears 65 engaged with the gears 68 to rotate the turntable or annulus 20 to move the shovel or scoop to one side of the tractor. Through the operation of the lever 53, the scoop may be moved to a dumping position as shown by the dotted lines in Figure 1 of the drawings, whereupon it may thereafter be returned to its normal position and lowered. In raising and lowering, the side arms of the yoke 25 will act as guiding means for the rods 48 and 50 and prevent their contact with the tractor. In order to control the lowering movement of the scoop or shovel there is provided a brake which includes a drum 74 which is mounted upon the shaft 35 and which is engaged by a brake band 74' normally held in engagement with the drum by means of a weighted arm 75. This arm is mounted upon one end of a rod or shaft 76 which in turn has secured thereon an arm 77, while connected to the arm 77 is an operating rod 78, which may be either foot or hand controlled. By rocking the shaft or rod 76 through the medium of the operating rod 78, the brake drum may be released sufficiently to permit the scoop or shovel to lower and its lowering movement controlled.

The invention is susceptible of various changes in its form, proportions and minor details of construction and the right is herein reserved to make such changes as properly fall within the scope of the appended claims.

Having described the invention what is claimed is:—

1. A tractor of the character described having a frame mounted thereon, a turntable mounted on the frame, a boom supported upon the turntable, carrying the weight at one end and a pulley at the other, a scoop pivotally and hingedly secured to or supported in advance of the tractor and immediately beneath the pulley carried by the boom, a drum carried by the frame and having a cable operatively connecting the same and scoop whereby the latter may be raised and lowered over the pulley, a plurality of gear members operatively connecting the turntable at drum with the tractor.

2. A tractor of the character described comprising a frame including a plurality of substantially offset members, a boom secured to the upper end portions of the offset members and carrying a weight at one end and a pulley at the other, a scoop pivotally supported in advance of the tractor and having operating means connected therewith for raising the same, means connected to said scoop and frame for dumping the same, a drum supported upon said frame and connected with the operating means of said tractor, and a cable running along the boom and over the pulley thereon and connected to the upper portion of the scoop in order to facilitate the raising and lowering of same.

In testimony whereof I affix my signature.

PETER FURST.